(12) United States Patent
Lowry (10) Patent No.: US 6,384,129 B1
(45) Date of Patent: May 7, 2002

(54) SEMI-BATCH EMULSION PROCESS FOR MAKING DIENE RUBBER LATEX, RUBBER LATEX MADE THEREBY, AND GRAFT COPOLYMER MADE THEREFROM

(75) Inventor: Vern Lowry, Washington, WV (US)

(73) Assignee: General Electric Company, Pittsfield, MA (US)

( * ) Notice: Subject to any disclaimer, the term of this patent is extended or adjusted under 35 U.S.C. 154(b) by 1094 days.

(21) Appl. No.: 08/521,554

(22) Filed: Aug. 30, 1995

(51) Int. Cl.⁷ .............................. C08L 51/00; C08F 2/00
(52) U.S. Cl. .................. 524/534; 524/836; 526/81; 526/87
(58) Field of Search ................. 524/836, 534; 526/81, 87

(56) References Cited

U.S. PATENT DOCUMENTS

| | | | |
|---|---|---|---|
| 2,834,760 A | 5/1958 | Orr et al. ................. | 260/82.5 |
| 3,337,515 A | 8/1967 | La Heij et al. ........... | 260/84.1 |
| 3,562,240 A | 2/1971 | Milletto et al. .......... | 260/94.3 |
| 3,563,946 A | 2/1971 | Miller et al. ............. | 260/29.7 |
| 4,070,324 A | 1/1978 | Fronzoni et al. ......... | 260/29.7 |
| 4,150,004 A | 4/1979 | Schlueter ................. | 260/237 |

FOREIGN PATENT DOCUMENTS

EP   0 644 205 A   3/1995

OTHER PUBLICATIONS

Verdurmen, E.M.F.J., "Particle Nucleation and Growth in Butadiene Emulsion Polymerization" Ph.D. Thesis, Eindhoven University of Technology, Eindhoven The Netherlands, 1993.

Bhakuni, Roop S., "Kinetics of the Persulfate–Mercaptan Emulsion Polymerization of Butadiene" Ph.D. Thesis, University of Akron, 1964.

Weerts, P.A., "Emulsion Polymeization of Butadiene a Kinetic Study" Ph.D. Thesis, Eindhoven University of Technology, Eindhoven The Netherlands, 1990.

Broadhead, T.D., "Dynamic Modeling of the Emulsion Co–polymerization of Styrene/Butadiene" Master Thesis, McMaster University, 1984.

Schlueter, H., "Fast Emulsion Polymerization at High Solids", Ind. Eng. Chem., Prod. Res. Dev., vol. 16, No. 2, 1977 pp. 163–168.

Brown, R.W. and Howland, L.H., "Growth and Agglomeration of Particles in Low–Temperature GR–S Type of Latex", Rubber World, Jul., 1955, pp. 471–486.

*Primary Examiner*—Peter D. Mulcahy (57) ABSTRACT

A semi-batch process is provided for making a diene rubber latex. The process involves (a) providing an amount of an initial liquid batch composition (containing water, emulsifier and diene monomer), sufficient to occupy from 50 to 80 volume percent of a pressure reaction vessel based on the total volume of the vessel, (b) feeding to the vessel a liquid feed composition containing diene monomer and initiator, (c) providing cooling to the vessel to cool the liquid and vapor therein, and (d) reacting the diene monomer to a final diene monomer conversion level of at least 80 mol percent based on the total moles of diene monomer used in the reaction, and the final liquid volume level in the vessel being at least 80 volume percent based on the total volume of the vessel. The process allows for a high initial reaction rate which peaks early in the process when efficient vapor phase cooling is maximized, and maintains a low latex viscosity throughout the process thereby providing efficient liquid phase cooling during latex in the process. The present process allows for higher levels of production over batch utilizing the same vessel volume. A rubber latex is also provided having a narrow particle size distribution, and a vinyl aromatic-diene rubber graft copolymer is provided exhibiting certain advantageous properties.

22 Claims, 8 Drawing Sheets

SEMI-BATCH EMULSION PROCESS FOR MAKING DIENE RUBBER LATEX, RUBBER LATEX MADE THEREBY, AND GRAFT COPOLYMER MADE THEREFROM

BACKGROUND OF THE INVENTION

1. Field of the Invention

The present invention relates to emulsion processes for making rubber latex, rubber latex made therefrom, and graft copolymers made therefrom, and more particularly relates to emulsion processes for making diene rubber latex, diene rubber latex, and graft copolymer made therefrom.

2. Description of the Related Art

Batch processes for making diene rubber latex are known, see, for example, Fronzon, et al., U.S. Pat. No. 4,070,324, issued Jan. 24, 1978, and Miller, et al., U.S. Pat. No. 3,563,946, issued Feb. 16, 1971, both of which are incorporated herein by reference. Batch processes have generally (a) had undesirable heat generation patterns with heat generation peaking as latex viscosity is peaking thereby creating peak heat removal demand from the liquid phase when liquid phase heat removal is at its most inefficient due to the high liquid viscosity, (b) utilized less than substantially all of the vessel volume due in part to the liquid volume shrinkage during the process, (c) required undesirably long reaction times in order to control heat removal from the exothermic reaction, and (d) required high peak loads on the heat removal equipment. Such processes also undesirably typically provided somewhat broad rubber particle size distributions and provided high levels of very small particles (<500A).

Consequently, there is a need to provide a batch type emulsion diene polymerization process which (a) exhibits peak heat generation during the most efficient heat removal period of the process, (b) utilizes an increased volume of the reactor vessel for the final liquid latex, (c) produces an increased level of diene rubber for a given vessel size, (d) maintains a reduced latex viscosity throughout the process and (e) minimizes the amount of unreacted diene monomer in the vessel. There is also a need for a batch type process that provides narrow particle size distribution for use in making graft copolymers.

SUMMARY OF THE INVENTION

The present invention provides a semi-batch process for making diene rubber latex in a pressure vessel. The process involves (a) providing the vessel with an initial liquid batch composition comprising water, emulsifier and diene monomer and optionally inorganic and organic salts, (b) feeding into the vessel a liquid feed composition comprising diene monomer and initiator in which the initiator may be dissolved in water. The rate of feed is such that (a) the level of unreacted diene monomer is minimized, (b) peak heat generation occurs early in the process, (c) the process allows for increase production over straight batch processes for a given vessel size, and (d) the process maintains a reduced latex viscosity throughout the process. A rubber latex and graft copolymer made therefrom is also provided.

DETAILED DESCRIPTION OF THE INVENTION

Figure 1:
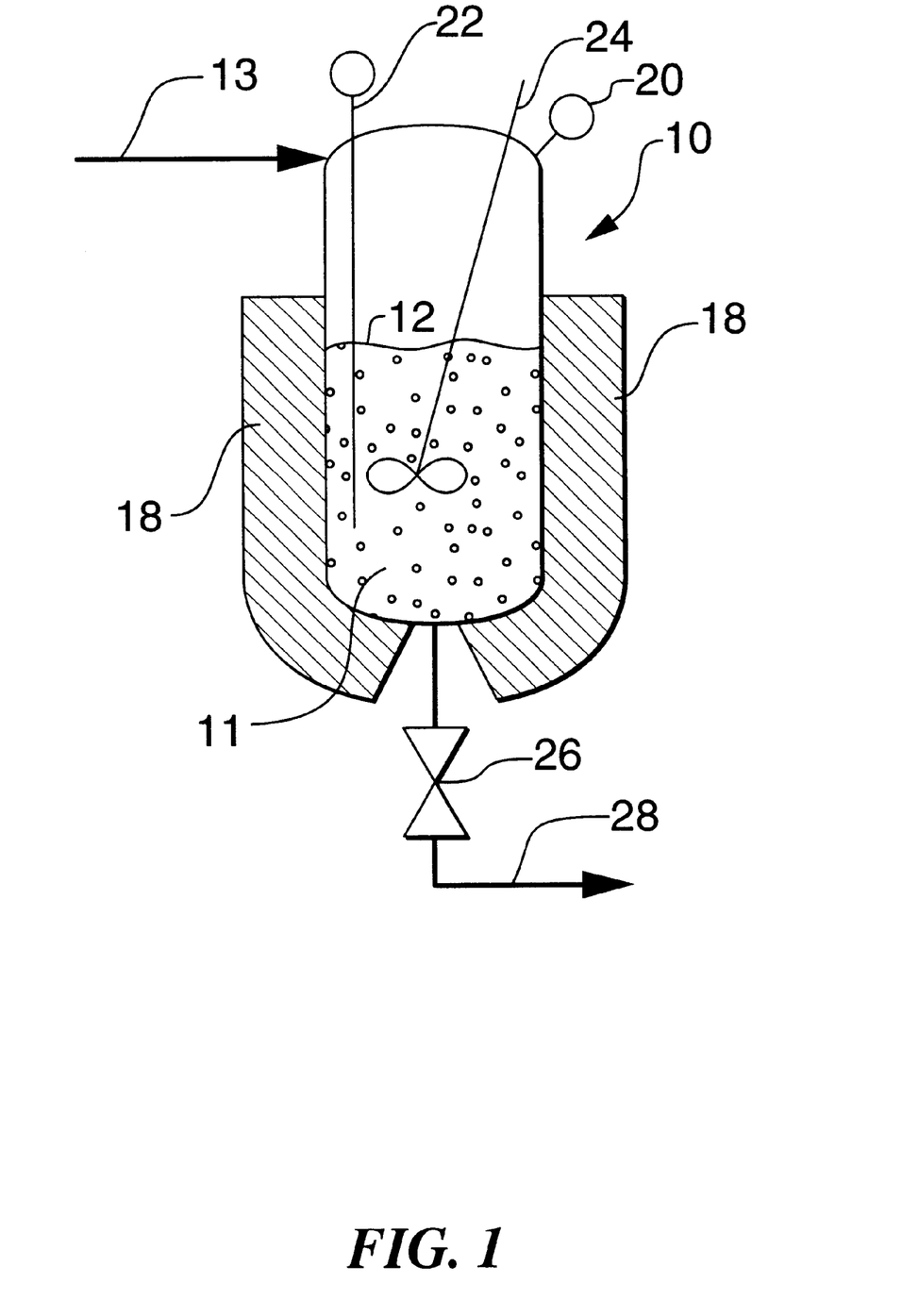
FIG. 1 is a schematic drawing of a process according to the present invention in its initial stage.
Figure 2:
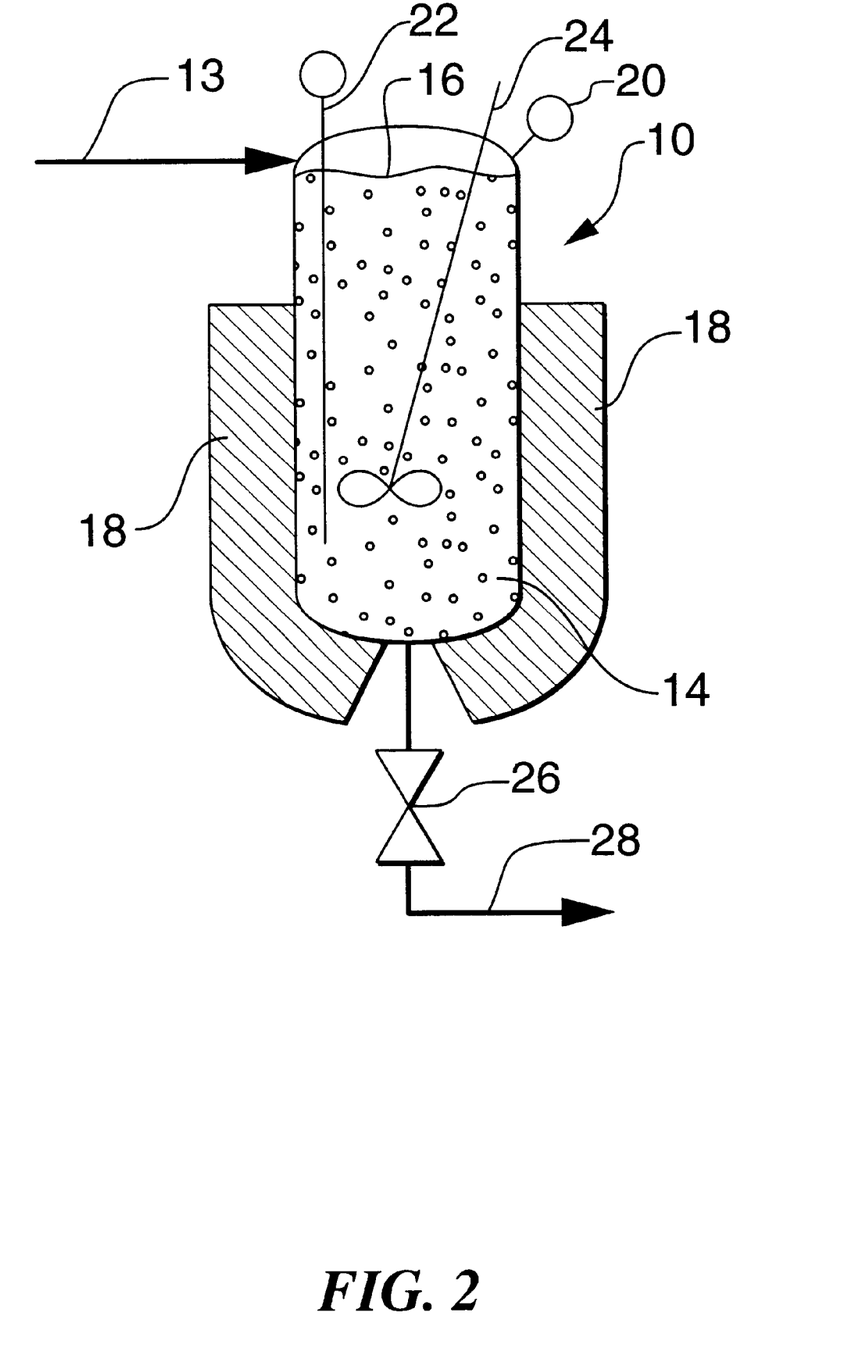
FIG. 2 is a schematic drawing of the process according to the process of FIG. 1 depicted at its final stage.
Figure 3A:
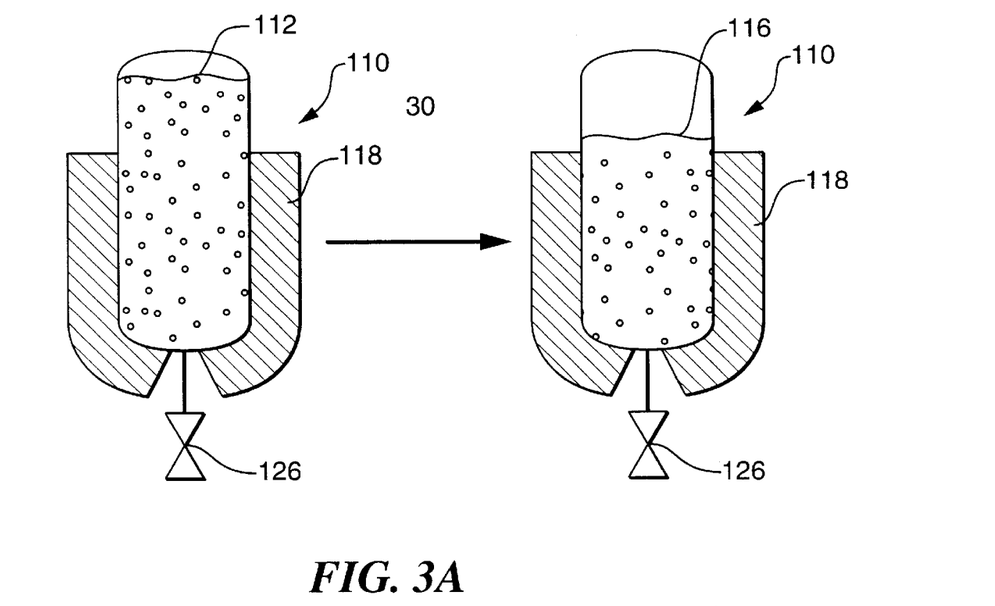
FIG. 3A is a schematic drawing of an initial stage and a final stage of a comparative batch process.
Figure 3B:
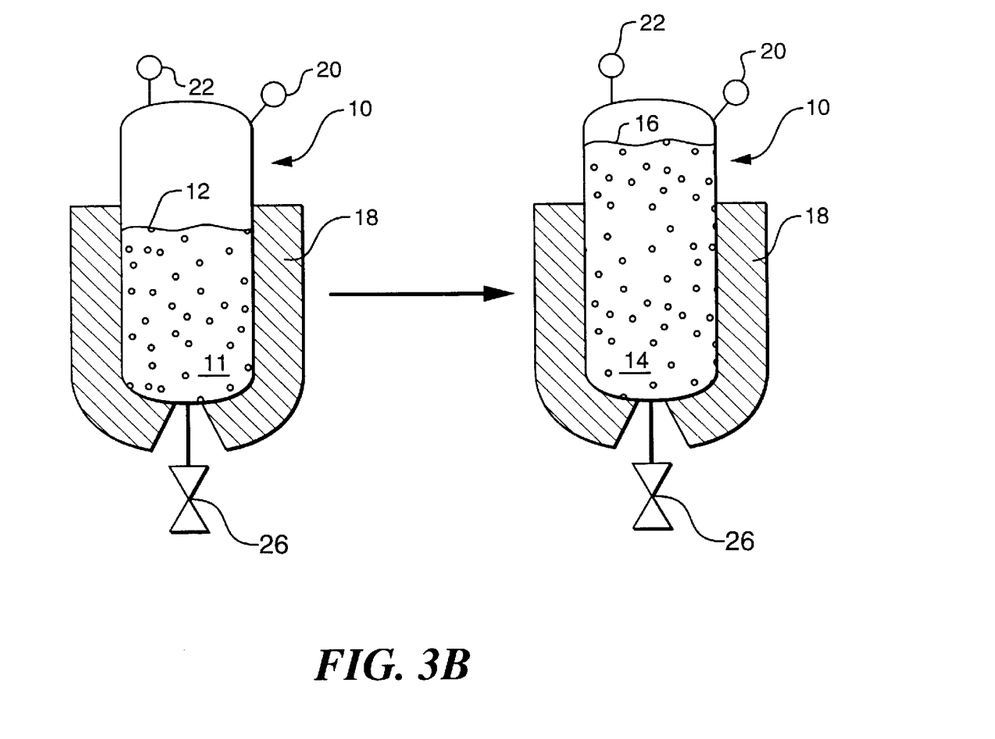
FIG. 3B is a schematic drawing of the initial stage and final stage according to the present process as shown in FIGS. 1 and 2.

As shown in FIGS. 1, 2 and 3B, a semi-batch process is provided for the production of a diene based synthetic rubber latex through emulsion polymerization in a pressure vessel (10). The process involves (a) providing the vessel (10) with an initial liquid batch composition (11) sufficient to occupy 40 to 80 percent of the volume of the vessel as illustrated by initial liquid level (12), (b) feeding a liquid feed composition (13) into the vessel, and (c) reacting the diene monomer in the vessel (10) during and after the feeding to produce a final liquid composition (14) (see FIG. 2) containing rubber latex particles.

The initial liquid batch composition comprises (a) water, (b) emulsifier and (c) diene monomer, and may contain various additives and comonomers. Preferably the liquid batch composition also contains (d) electrolytes, (e) reducing agents, (f) heavy metal salts and (g) complexing agents. The initial liquid batch composition is provided to the vessel (10) at a level (12) sufficient to occupy 40 to 80 percent of the volume of the vessel, more preferably from 50 to 70 percent thereof, and most preferably 50 to 60 percent thereof. The volume of the vessel (10) is defined as the internal volume of the vessel available for occupation by the liquid and vapor containing diene reactant. This relatively low initial liquid level allows for a maximization of efficient vapor space cooling; and when utilizing a high activity initiator in the feed composition, the reaction rate and heat generation rate can be at a peak early in the process while the liquid level is relatively low and while the efficient vapor cooling space is maximized. The initial liquid batch composition preferably contains from 10 to 30 mol percent of the total moles of diene monomer used in the process, more preferably from 15 to 25 mole percent thereof, and most preferably 18 to 22 mole percent thereof. This low level of initial diene monomer allows for greater reaction rate control.

The feed composition (13) comprises (A) diene monomer and (B) initiator, and may optionally contain other additives and comonomers. The feed composition (13) will supply the remaining diene monomer to the reaction vessel over a period of time and at a controlled rate to achieve a final liquid volume (final level (16)) of at least 80 volume percent in the reactor based on the total volume of the reactor preferably at least 83 volume percent, and most preferably 84 volume percent and a diene monomer conversion of at least 80 mol percent, more preferably at least 90 mol percent, and most preferably 94 mol percent based on the total moles of diene used in the process.

The entire reaction rate is enhanced by the ability to use a high activity initiator in the process by introducing the initiator with the feed and maximizing the heat generation rate early in the process. Preferably the reaction rate peaks during the first two hours of the reaction when the vapor space is greatest in the vessel thereby allowing for the greatest level of vapor space cooling which is generally more efficient than the liquid space cooling.

The latex viscosity of the present invention preferably is no greater than 200 centipoise (for example, as measured by using Automation Products, Inc. Model #CL-10 DV3 online viscometer), and more preferably between 50 and 200 centipoise throughout the reactor. In contrast, a simple batch reaction can generate latex viscosities exceeding 200 centipoise, for example, greater than 300 centipoise. Generally, increases in viscosity result in decreases in cooling efficiency in the liquid phase.

The heat removal demand of the present semi-batch process allows for more evenly distributed cooling load on the vessel cooling jacket (18) than generally does a simple batch reaction which can provide peak loads in the middle of the reaction process.

The semi-batch process also has a reduced level of unreacted diene monomer in the vessel throughout the process compared to batch processes thereby providing a greater level of control over the reaction, and the semi-batch process also allows for reduced vessel pressure (pressure gauge (20)).

The rubber latex is a diene rubber latex. Suitable diene monomers include butadiene and isoprene and various comonomers may be present to produce copolymers of butadiene with up to 50 percent by weight (for example, up to 35 percent by weight) of comonomers such as styrene, acrylonitrile, methylmethacrylate or $C_1$–$C_6$-alkylacrylate. The polymers and copolymers are produced by aqueous radical emulsion polymerisation and may optionally be cross-linked with di or trivinyl or allyl monomers or mixtures of such monomers or structures.

Comonomers may be present in the rubber at a level of less than 50 percent by weight, preferably less than 40 weight percent and most preferably less than 20 weight percent based on the total weight of the monomers. Most preferably no comonomer is used due generally to the tendency of comonomer to reduce the efficiency of the reflux cooling. Suitable comonomers include vinyl aromatic monomers and vinyl cyanide (unsaturated nitrile) monomers.

Monovinylidene aromatic monomers (vinyl aromatic monomers) which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinyl aromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Suitable vinyl cyanide monomers include acrylonitrile and substituted vinyl cyanides such as methacrylonitrile. The acrylonitrile and substituted acrylonitrile are described generically by the following formula:

wherein $R^1$ may be selected from the same group set out for R as previously defined. Examples of such monomers include acrylonitrile, ethacrylonitrile, methacrylonitrile, α-chloroacrylonitrile, and α-bromoacrylonitrile.

The preferred initiator is a high activity redox initiator such as cumene hydroperoxide or other hydroperoxides in combination with other compounds such as reducing agents, heavy metal salts and complexing agents. The initiator should be sufficient to provide an initial reaction rate (for example, at hour 2) of at least 10 percent of the total diene of the reaction reacted per hour, and preferably at least 15 percent, and more preferably between 16 and 20 percent. Thermal initiators should provide similar results if sufficient polymerization rates can by obtained.

A semi-batch process for the production of a diene based synthetic rubber latex through emulsion polymerization in a pressure vessel, said process comprising: (a) providing the vessel with an amount of an initial liquid batch composition sufficient to occupy from 40 volume percent to 80 volume percent of the total volume of said vessel thereby providing the vessel with an initial vapor space of 20 to 60 volume percent based on the total volume of the vessel, said initial liquid composition comprising (i) water, (ii) an emulsifier and (iii) a diene monomer, said diene monomer being present at a level of from 10 to 30 percent by volume based on the total volume of diene monomer charged during the entire semi-batch process, said initial liquid composition having a temperature of between 120 to 155° F. (temperature gauge (22)) and corresponding initial vapor pressure providing cooling to said vessel during said continuous feeding to cool said liquid and said vapor, (b) continuously feeding a liquid feed composition to said vessel, said liquid feed composition comprising (i) diene monomer and (ii) an initiator, (c) providing cooling to said vessel during said continuous feeding to cool said liquid and said vapor, (d)

reacting said diene monomer during and after said continuous feeding to a final diene monomer conversion level of at least 80 mol percent based on the total moles of diene monomer used in the reaction, said vessel having a liquid volume level of at least 80 volume percent based on the total volume of the vessel.

Preferably the entire reaction time is no greater than 9 hours and preferably the final reaction temperature is between 160° F. and 180° F. The rubber latex produced preferably has a number average particle size diameter of between 600 Angstroms and 1200 Angstroms, and has less than 10% by number of particles having diameters of less than 500 Angstroms. The viscosity of the reaction liquid is preferably less than 200 centipoise throughout the reactor. The feeding preferably occurs at a rate of between 5 and 20 volume present per hour based on the total volume of the initial batch liquid composition, and preferably the feeding is completed during the first 2 to 6 hours of the process. Preferably, the 20 to 60 percent of the heat of reaction removed via vapor cooling (condensation of the diene monomer and optional comonomers). Mixing is preferably done during the reaction by using a stirrer (24).

Figure 4A:
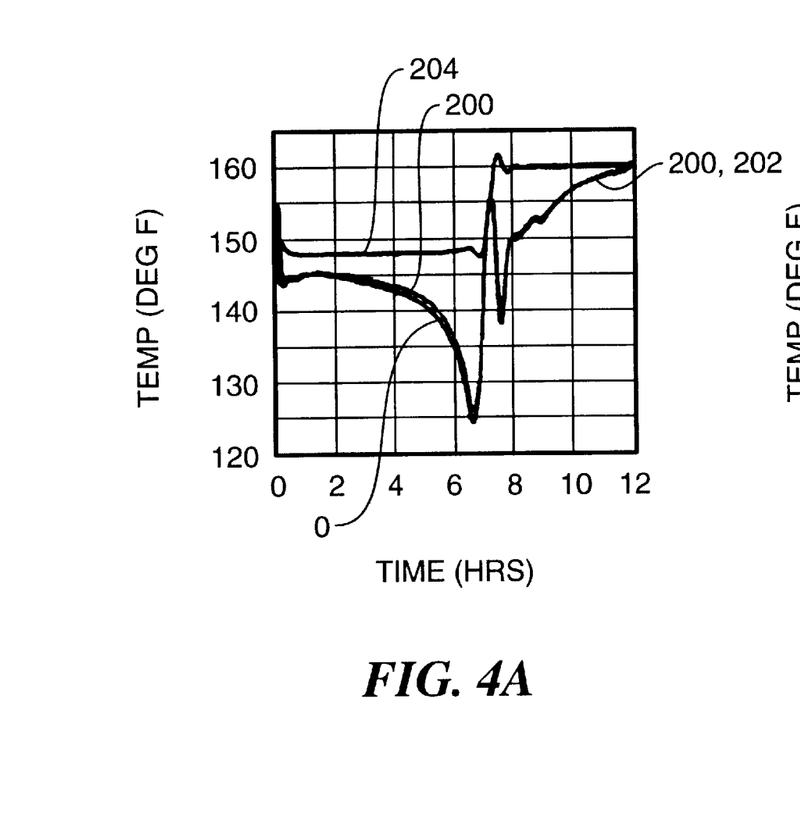
FIG. 4A is a diagram of temperature profile for the comparative batch process of FIG. 3A.
Figure 4B:
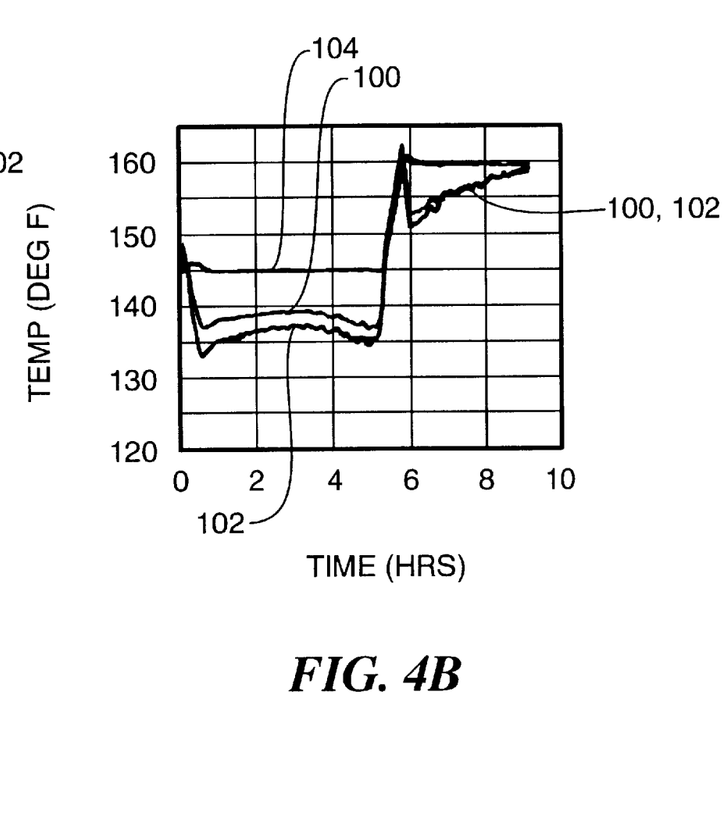
FIG. 4B is a diagram of temperature profile for the semi-batch process of FIG. 3B.
Figure 5:
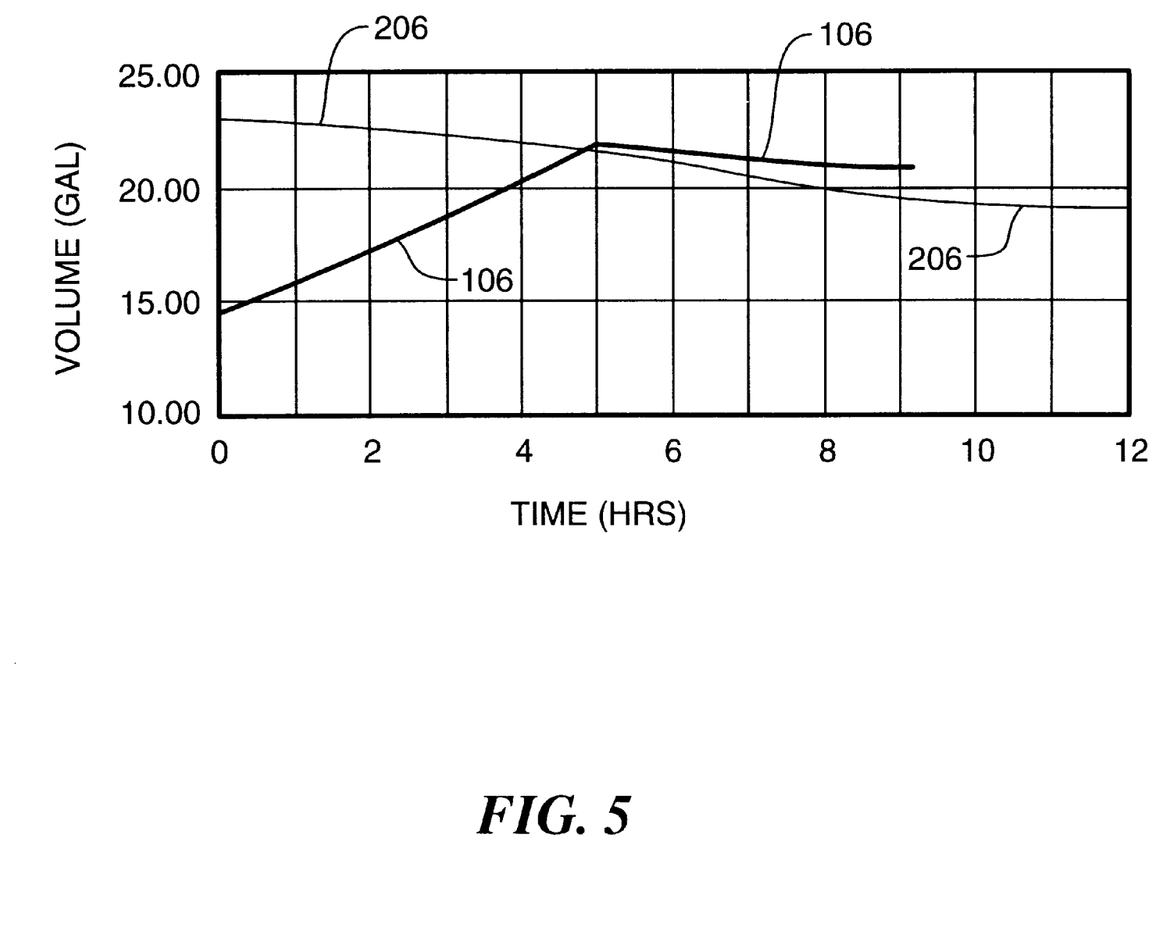
FIG. 5 is a profile of reactor volumes of the batch process of FIG. 3A and the semi-batch of FIG. 3B.
Figure 6:
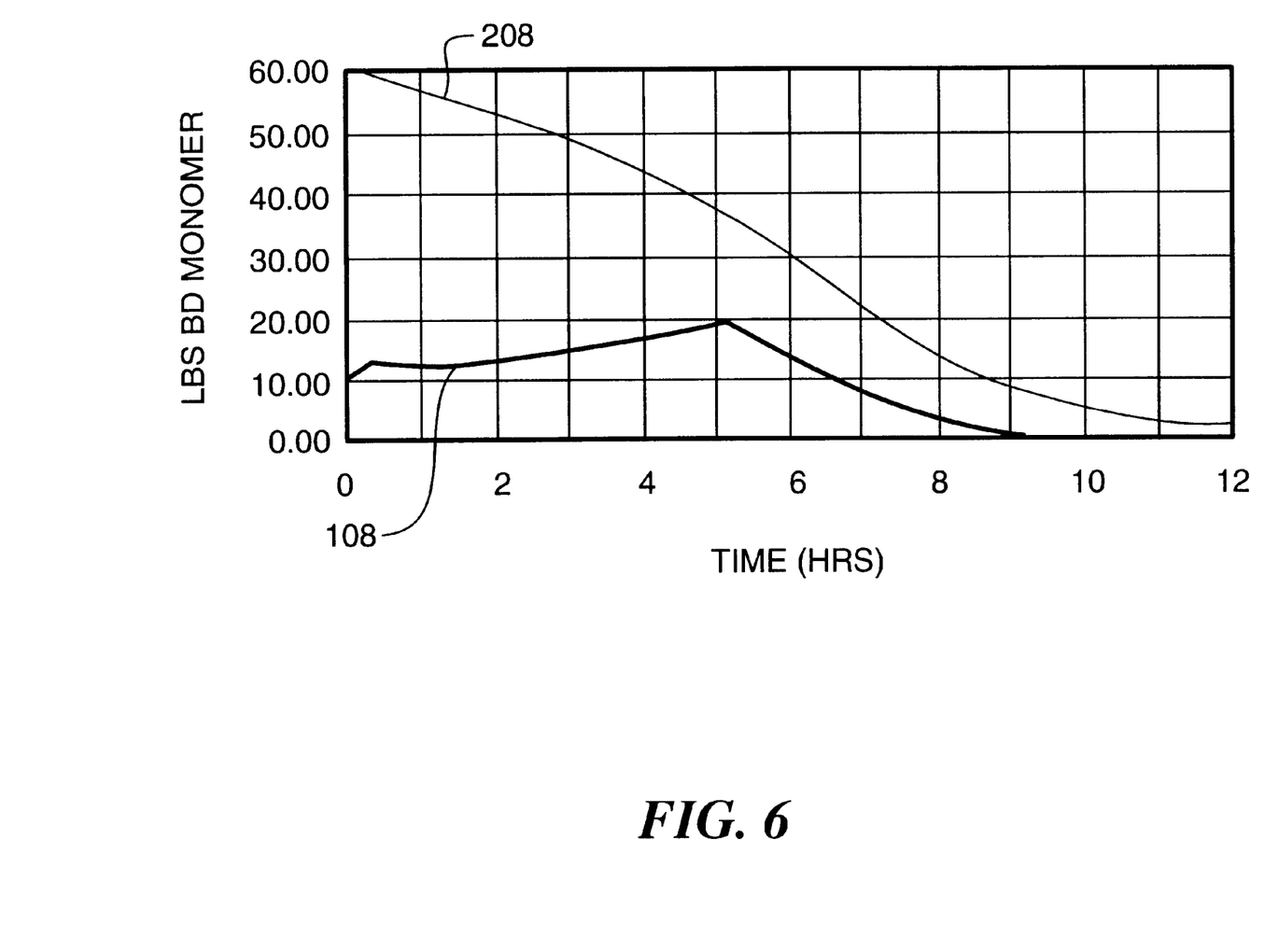
FIG. 6 is a diagram of unreacted diene monomer amounts in the batch process of FIG. 3A and semi-batch process of FIG. 3B.
Figure 7:
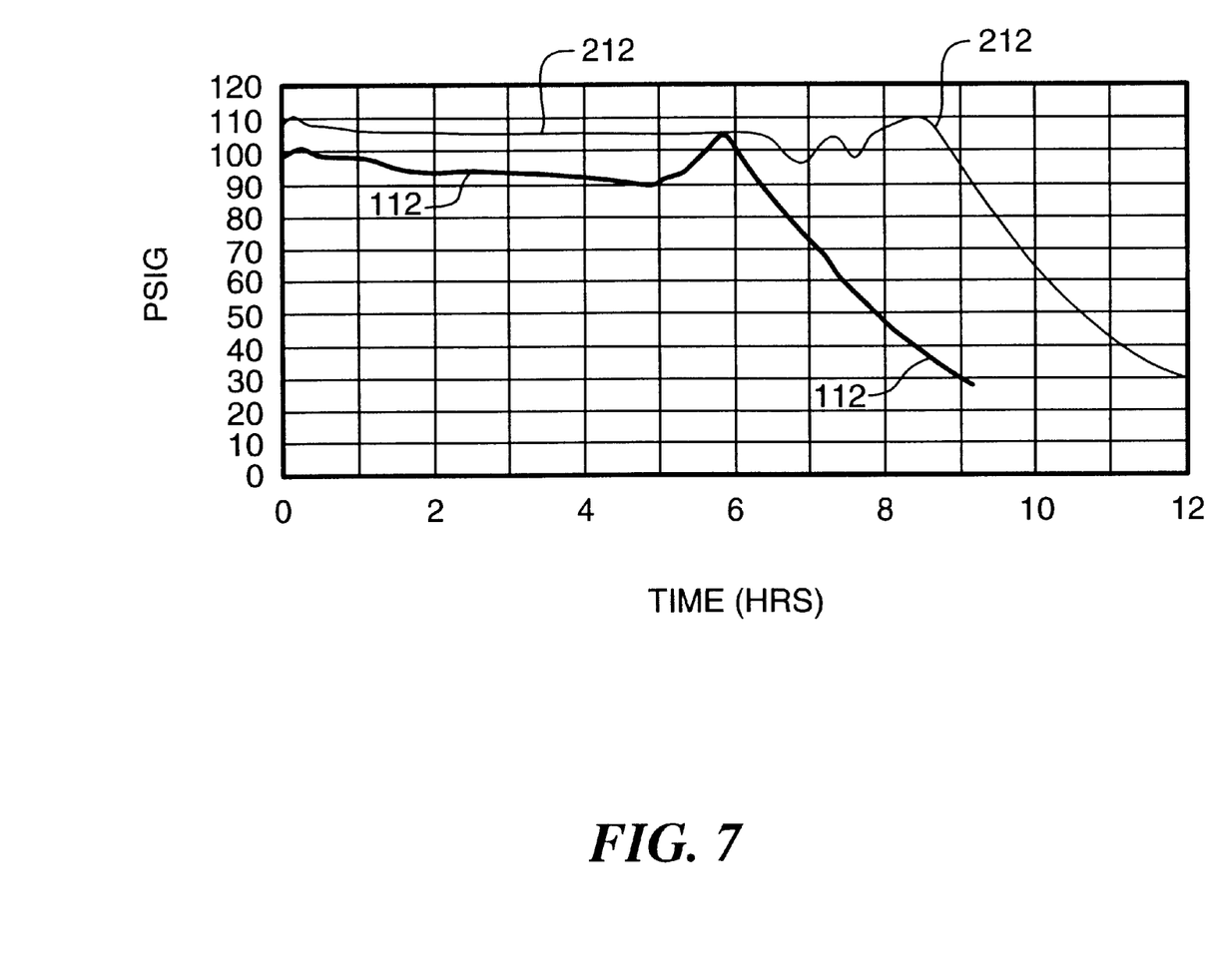
FIG. 7 is a diagram of vessel pressures for the batch of FIG. 3A and semi-batch process of FIG. 3B.
Figure 8A:
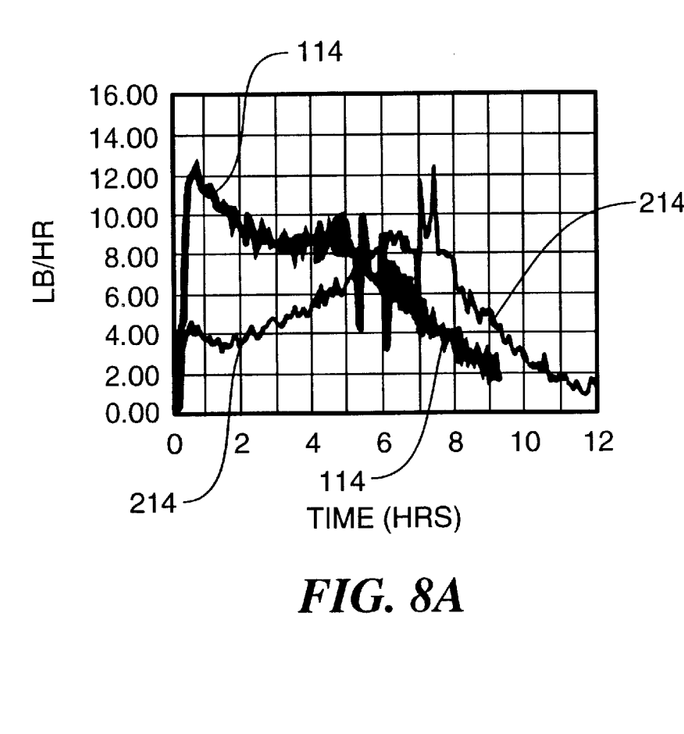
FIG. 8A is a diagram of reaction rates of the batch process of FIG. 3A and semi-batch process of FIG. 3B.
Figure 8B:
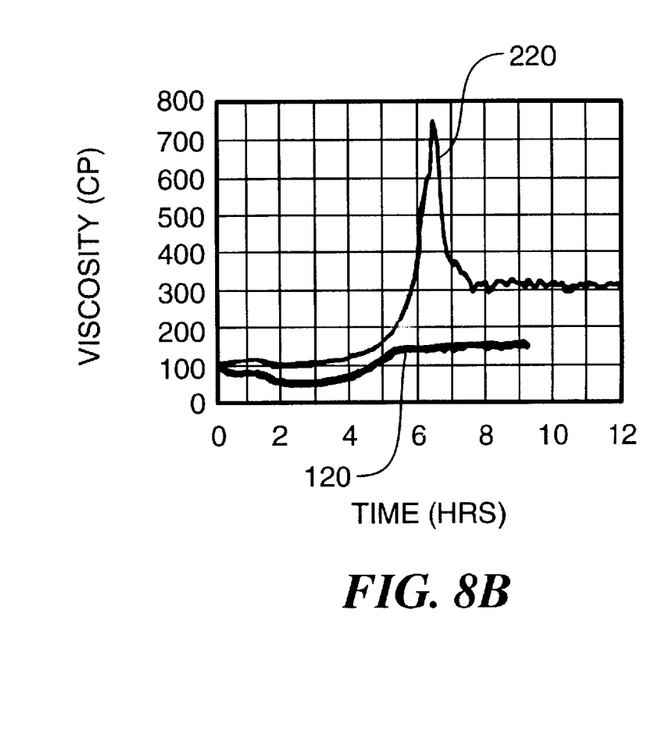
FIG. 8B is a diagram of the viscosity levels of the batch process of FIG. 3A and the semi-batch process of FIG. 8B.

The final liquid batch composition may be withdrawn from the vessel by actuation (opening) of the valve (26), thereby providing a final product flow stream (28). In FIG. 1, the valve (26) is closed and no product is flowing as stream (28), whereas in FIG. 2 the valve may be open for flow of product as stream (28). As shown in FIG. 3B, a comparative batch process (30) is compared with an illustrative semi-batch process (32) of the present invention. As shown in FIG. 4A and FIG. 4B, a comparison batch process jacket temperature profile (34) is compared to the present semi-batch process jacket temperature profile (36). As shown in FIG. 5, a comparison of reactor volume profiles is provided for a comparative batch reaction and the semi-batch reaction of the present process. As shown in FIG. 6, a comparison of the amounts of un-reacted diene (BD) monomer in the reactor is compared for a comparative batch reaction and the present semi-batch reaction. FIG. 7 provides a comparison of vessel pressures for a comparative batch reaction and the semi-batch reaction of the present invention. FIGS. 8A and 8B provides a comparison of reaction rates and latex viscosities between a comparative batch process and the semi-batch process of the present invention, and note the elimination of the latex viscosity spike by the present process, and note the better match of heat removal and heat generation obtained by the present process.

As shown in FIGS. 1 and 3B, the initial liquid level (12) of the vessel (10) of the semi-batch process is relatively low and the liquid feed composition (13), which may also be referred to as feed stream (13), is added during the process, and the final liquid volume (16) is relatively high as shown in FIGS. 2 and 3B. A comparative batch process is shown in FIG. 3A, and a vessel (110), has pressure and temperature gauges (now shown), a stirrer (not shown), a cooling jacket (118), an inlet (not shown), and an outlet valve (126), and has a relatively high initial liquid level (112) and a relatively low final liquid volume (116). As set out above the comparative batch process has a number of problems and disadvantages solved by the present semi-batch process.

As shown in FIG. 4A, the batch process has a jacket temperature/time profile (200), (202) (temperatures of the two jacket halves are shown and essentially overlap) which shows a substantial cooling load requirement in the middle of the process (around the 6th hour in FIG. 4A) and FIG. 4A shows the liquid reaction composition temperature profile (204) of the batch process. As shown in FIG. 4B, the semi-batch process has a jacket temperature time profile (100, 102) (temperatures of the two jacket halves are shown and essentially overlap) which shows a relatively moderate peak cooling load compared to the batch process of FIG. 4A, and FIG. 4B shows the reaction liquid composition temperature profile (104) from time 0 (initial liquid composition (11) temperature) to around time 9 hour (the final liquid composition (14) temperature.

As shown in FIG. 5, the comparative batch process has a volume profile (206) which starts at a relatively high level and decreases as the reaction proceeds; and the semi-batch process has a volume profile (106) which starts relatively low and gradually increases until feeding is completed and then gradually decreases as the process proceeds. The final volume of product for a given vessel size is substantially higher for the present process over the comparative process.

As shown in FIG. 6, the amount of unreacted diene monomer present in a given vessel volume is substantially lower through the present semi-batch process, compared to the comparative batch process. The unreacted butadiene (BD) monomer level in the vessel of the semi-batch process is shown by semi-batch monomer profile (108) and the comparative batch process unreacted monomer level is shown by batch monomer profile (208).

As shown in FIG. 7, the reactor vessel pressure is generally lower for the semi-batch process than the batch process and as shown by a comparison of batch process pressure profile (212) and semi-batch pressure profile (112).

As shown in FIG. 8A, the reaction rate of the semi-batch is shown as reaction rate profile (114) and the batch reaction rate is shown as reaction rate profile (214). The present semi-batch process allows for faster initial reaction rate than the comparative batch process.

As shown in FIG. 8B, the viscosity of the liquid reaction composition in the semi-batch process is generally substantially lower than the viscosity in the comparative batch process, as illustrated by the comparison of the semi-batch viscosity profile (120) and the batch viscosity profile (220).

General classes of emulsifiers include alkali metal salts of fatty acids, disproportionated rosin acids or alkyl or arylalkyl sulfonates.

EXAMPLES

In the semi-batch process, some of the butadiene monomer and all of the cumene hydroperoxide (CHP) initiator are held out of the initial batch charge and fed during the course of the reaction. In other words, the initial liquid batch composition was free of initiator. The initiator is fed to the reaction vessel via the liquid feed composition. The rate at which these components are fed can be used to control the rate of reaction.

Experimental work in the pilot plant verifies potential advantages of a semi-batch polybutadiene emulsion process. Seven to eight hour reactions have been run in the pilot plant compared to 11 to 12 for standard batch polybutadiene emulsion process. Compared to standard processes these reactions demonstrate an improvement in heat load distribution through a more constant heat generation rate and improved heat transfer. The present semi-batch process eliminates the viscosity spike typically observed for standard polybutadiene batch emulsion processes. Also, the larger particle size possible with the present semi-batch process lowers viscosity and further improves heat transfer.

Several important heat transfer mechanisms have been identified for the new semi-batch process via pilot plant reactions and heat transfer modeling efforts. Heat transfer through liquid contact with the reactor jacket and baffles is the standard mode of heat removal. However, reflux cooling due to butadiene vapor in contact with the cold jacket and baffles plays an important role in heat removal for the semi-batch process. Heat transfer coefficients for reflux cooling are an order of magnitude higher than liquid jacket cooling which represents a significant improvement in heat transfer compared to the batch process.

The semi-batch reaction desirably results in lower reactor pressure and a lower level of unreacted monomer. Therefore, it provides an increase degree of flexibility in preventing run away reactions and over pressurization of the reactor. Also, the reaction rate and pressure decrease when the monomer flow is stopped, thereby creating a tool which can be used to stop the reaction quickly which is something the current batch processes generally do not have.

Initial liquid semi-batch composition was 11.563% butadiene, 86.719% water, 0.231% TDDM, 1.156% TFA, 0.064% KUH, 0.231% TSPP, 0% CHP, 0.029% SFS, 0.006% $FeSO_4$, 0.002% $Na_2EDTA$. Start volume for the semi-batch composition in the vessel was 50–60 volume %, T–145° F., P=100–105 PSIG, conversion =0%; and the ending vessel conditions were as follows: liquid volume 84%, T=160° F., P=35–45 PSIG, conversion=94 mol %, butadiene level=6% based on the total butadiene used in the process, and total reaction time was 8.5–9.5 hours.

In comparison, a single batch process using the same ingredients exert a slower PPS initiator rather than the CHP initiator and Redox components provides an initial liquid volume of 90%, T=148° F., P=105–112 psig, conversion=0 initially, butadiene=100% based on total butadiene used in the process, and the final vessel conditions were liquid volume 75%, T=160° F., P=35–40 PSIG, conversion=94%, butadiene=6% based on total butadiene used in the processing and reaction time was 11 to 12 hours.

monomer, said diene monomer being present at a level of from 10 to 30 mol percent based on the total mol of diene monomer charge during the entire semi-batch process, said initial liquid composition having a temperature of between 120° F. to 155° F., (b) continuously feeling a liquid feed composition to said vessel, said liquid feed composition comprising (i) diene monomer and (ii) an initiator, (c) proving cooling, independent of any cooling provide by said liquid feed of step (b), to said vessel during said continuous feeding of step (b) to cool said liquid and said vapor, (d) reacting said diene monomer during and after said continuous feeding of step (b) to a final diene monomer conversion level of at least 80 mol percent based on the total moles of diene monomer used in the reaction, said vessel having a liquid volume level of at least 80 volume percent based on the total volume of the vessel;

wherein said process produces a rubber latex having a number average particle size diameter of between 600 Angstroms and 1200 Angstroms.

2. The process of claim 1 wherein the entire reaction time for the process is no greater than 9 hours.

3. The process of claim 1 wherein the final reaction temperature of the liquid is between 160° F. and 180° F.

4. The process of claim 1 wherein the viscosity of the reaction liquid is less than 200 centipoise throughout the process.

5. The process of claim 1 wherein said diene monomer is butadiene.

6. The process of claim 1 wherein said feeding occurs at a rate of between 5 and 20 volume % per hour based on the total volume of the initial batch liquid composition.

7. The process of claim 1 wherein said feeding is completed during the first 2 to 6 hours of said process.

TABLE 1

Comparison of Properties of ABS Graft Copolymers Obtained Using Batch and Semi-Batch Substrate

| | IZOD IMPACT | HARDNESS ROCKWELL | VISCOSITY 100/1000 $SEC^{-1}$ | GLOSS 60/20 DEG | HAZE | COLOR L*/a*/b* | YELLOWNESS INDEX | OPACITY | DYNATUP FAIL-POINT STD. DEV. |
|---|---|---|---|---|---|---|---|---|---|
| A | 7.9 | 99.3 | 4370/1350 | 99/89 | 60 | 86.3/−0.5/15.8 | 24.6 | 88.5 | 26-5 |
| B | 7.6 | 100.3 | 4022/1338 | 98/90 | 57 | 77.8/−0.5/12.2 | 21.1 | 95.0 | 23-7 |
| C | 7.7 | 100.3 | 3841/1303 | 99/90 | 59 | 82.7/0.0/15.0 | 24.4 | 91.5 | 22-7 |
| D | 8.2 | 100.2 | 3736/1318 | 99/91 | 56 | 85.4/+0.4/17.3 | 27.1 | 89.8 | 25-6 |
| 1 | 9.0 | 99.1 | 4220/1369 | 99/90 | 57 | 86.9/−0.5/15.6 | 24.4 | 87.7 | 27-3 |
| 2 | 8.7 | 99.3 | 3924/1347 | 99/90 | 61 | 83.3/+0.1/13.7 | 22.3 | 91.2 | 29-3 |
| 3 | 8.5 | 99.7 | 4056/1370 | 99/90 | 58 | 85.3/+0.4/15.9 | 25.1 | 89.3 | 28-4 |
| 4 | 8.7 | 99.9 | 3660/1339 | 98/91 | 57 | 85.1/+0.4/16.6 | 26.2 | 88.8 | 26-6 |
| 5 | 8.8 | 99.7 | 4095/1368 | 99/90 | 62 | 85.0/+0.4/16.2 | 25.6 | 89.6 | 30-2 |

Examples A–D were comparative examples of ABS graft copolymer resin obtained by using a batch substrate.
Examples 1–5 were examples of the present invention utilizing a semi-batch substrate.
Note the improved impact/viscosity property balance of the ABS resin having a semi-batch substrate over the ABS resin having a batch substrate.

What is claimed is:

1. A semi-batch process for the production of a diene base synthetic rubber latex through emulsion polymerization in pressure vessel, said process comprising:

(a) providing the vessel with an amount of an initial liquid batch composition sufficient to occupy form 40 volume percent to 80 volume percent of the total volume of said vessel thereby providing the vessel with an initial vapor space of 20 to 60 volume percent base on the total volume of the vessel, said initial liquid composition comprising (i) water, (ii) an emulsifier and (iii) a diene 8. A semi-batch emulsion polymerization process for producing a diene rubber latex, said process comprising:

(a) providing a pressure vessel, (b) providing an amount of an initial liquid batch composition sufficient to occupy from 40 volume percent to 80 volume present of the total volume of the vessel, said initial liquid batch composition comprising (i) emulsifier, (ii) diene monomer, and (iii) water, (c) providing the initial liquid batch composition with an initial temperature of between 120° F. to 155° F., (d) continuously feeding a liquid feed composition into said vessel, said liquid feed composition comprising (i) diene monomer and (ii) initiator, said feeding being at a rate such that the level of unreacted diene monomer in the vessel is no greater than 50 percent of the total diene monomer used in the process wherein said latex has a number average particle size diameter of between 600 Angstroms and 1200 Angstroms, and has less than 10% by number of particles having a diameter less than 500 Angstroms.

9. A diene rubber latex made by the process of claim 1.

10. A diene rubber latex made by the process of claim 8.

11. A vinyl aromatic graft copolymer comprising a vinyl aromatic polymeric superstrate and a rubber substrate, said rubber substrate comprising rubber particles of claim 10.

12. The graft copolymer of claim 11 wherein the superstrate is a vinyl aromatic-vinyl cyanide copolymer.

13. The graft copolymer of claim 12 wherein the vinyl aromatic-vinyl cyanide copolymer is a styrene-acrylonitrile copolymer.

14. The process of claim 1 wherein 20 to 60% of the heat of reaction is removed via vapor cooling without an external reflux condenser.

15. The process of claim 1 wherein said initial liquid composition further comprises at least one ingredient selected from the group consisting of reducing agents, complexing agents, and metal salts.

16. The process of claim 1 wherein said initial liquid batch composition contains from 15 to 25 mole percent of the total moles of diene monomer.

17. The process of claim 16 wherein said initial liquid batch composition contains from 18 to 22 mole percent of the total moles of diene monomer.

18. The process of claim 1 wherein step (c) is done via a vessel cooling jacket.

19. A semi-batch process for the production of a diene based synthetic rubber latex through emulsion polymerization in a pressure vessel, said process comprising:

(a) charging to the vessel an amount of an initial liquid batch composition sufficient to occupy from 40 volume percent to 80 volume percent of the total volume of said vessel thereby providing an initial vapor space within the vessel of 20 to 60 volume percent based on the total volume of the vessel, said initial liquid composition comprising (i) water, (ii) an emulsifier and (iii) a diene monomer, said diene monomer being present at a level of from 10 to 30 mole percent based on the total moles of diene monomer charged during the entire semi-batch process, said initial liquid composition having a temperature of between 120° F. to 155° F.; wherein said initial vapor space provides efficient vapor space cooling of the liquid batch composition, (b) continuously feeding a liquid feed composition to said vessel, said liquid feed composition comprising (i) diene monomer and (ii) an initiator; wherein the process conditions set forth in steps (a) and (b) provide a maximum reaction rate and heat generation rate early in the process, while said liquid level is relatively low and while said vapor cooling space is relatively high, (c) reacting said diene monomer during and after said continuous feeding of step (b) to a final diene monomer conversion level of at least 80 mol percent based on the total moles of diene monomer used in the reaction, said vessel having a liquid volume level of at least 80 volume percent based on the total volume of the vessel, and (d) providing cooling, independent of any cooling provided by said liquid feed of step (b), to said vessel during said continuous feeding of step (b) to remove heat generated in steps (b) and (c).

20. The process of claim 19 wherein said initial liquid batch composition contains from 15 to 25 mol percent of the total moles of diene monomer.

21. The process of claim 20 wherein said initial liquid batch composition contains from 18 to 22 mole percent of the total moles of diene monomer.

22. The process of claim 19 wherein step (c) is done via a vessel cooling jacket.

* * * * *